March 21, 1950 S. E. M. NORLINDH 2,500,957
ROLL BEARING DEVICE
Filed Nov. 14, 1945 5 Sheets-Sheet 5

Inventor
Sven Erik Malte Norlindh,
by Pierce & Scheffler,
Attorneys.

Patented Mar. 21, 1950

2,500,957

UNITED STATES PATENT OFFICE 2,500,957

ROLL BEARING DEVICE

Sven Erik Malte Norlindh, Morgardshammar, Sweden

Application November 14, 1945, Serial No. 628,441
In Sweden November 22, 1944

2 Claims. (Cl. 80—55)

The present invention relates to a roll bearing device, preferably for rolling mills, and has for its purpose to offer the same advantages as the invention according to the patent application Serial No. 535,148, i. e. to replace the ordinary housings by a device which is less bulky, provides better possibilities of mounting of the rolls and enables a more rapid exchange of the rolls, and to cause the rolling pressure to be transmitted from one bearing box directly to the other bearing box via so-called stay-screws. However, this invention is a further step in simplifying direction because also the posts become superfluous without the device according to the invention losing any of the good qualities of the device set forth in the abovementioned patent application. A particular advantage which should be pointed out, is that bearings and rolls become accessible from all sides in quite another way than in older rolling mills.

The essential features of the present device are that bearings and rolls are mutually adjustably combined to a unit which is mounted on a foundation instead of in a housing or on posts and is fixed on this foundation with a releasable fixing device which is common to the whole device so that this unit or block can be rapidly replaced.

Several different embodiments of the present invention based upon the abovementioned idea are possible. An embodiment intended particularly for a twin high mill is hereinafter described by reference to the accompanying drawings.

Figure 1:
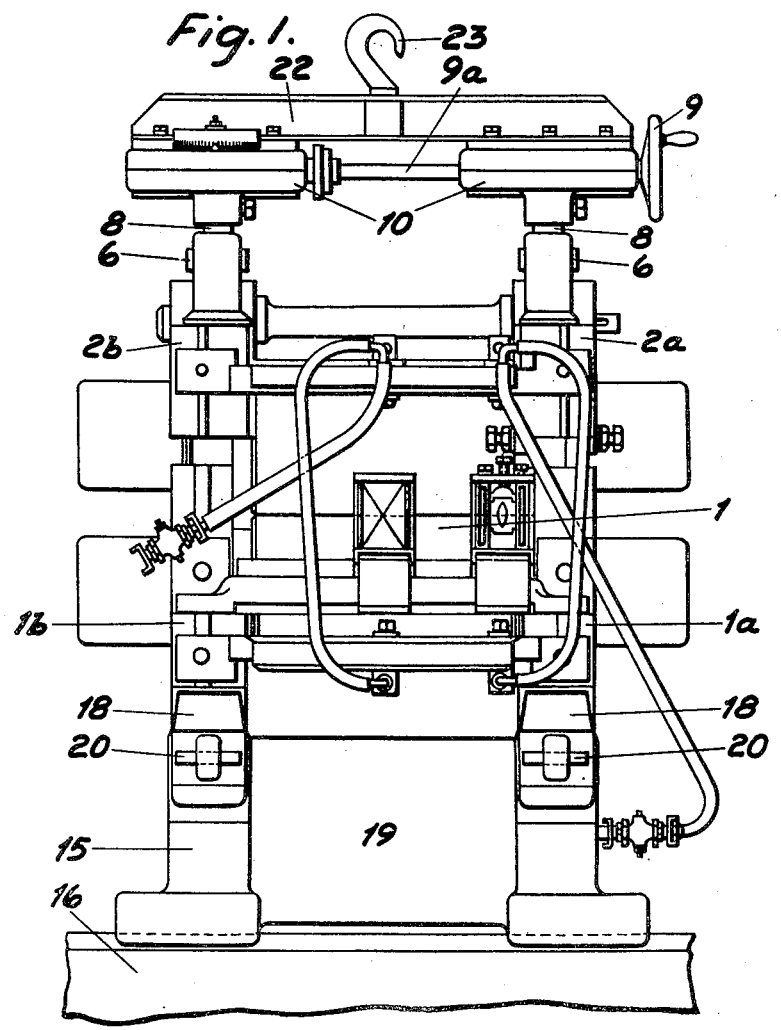
Figure 2:
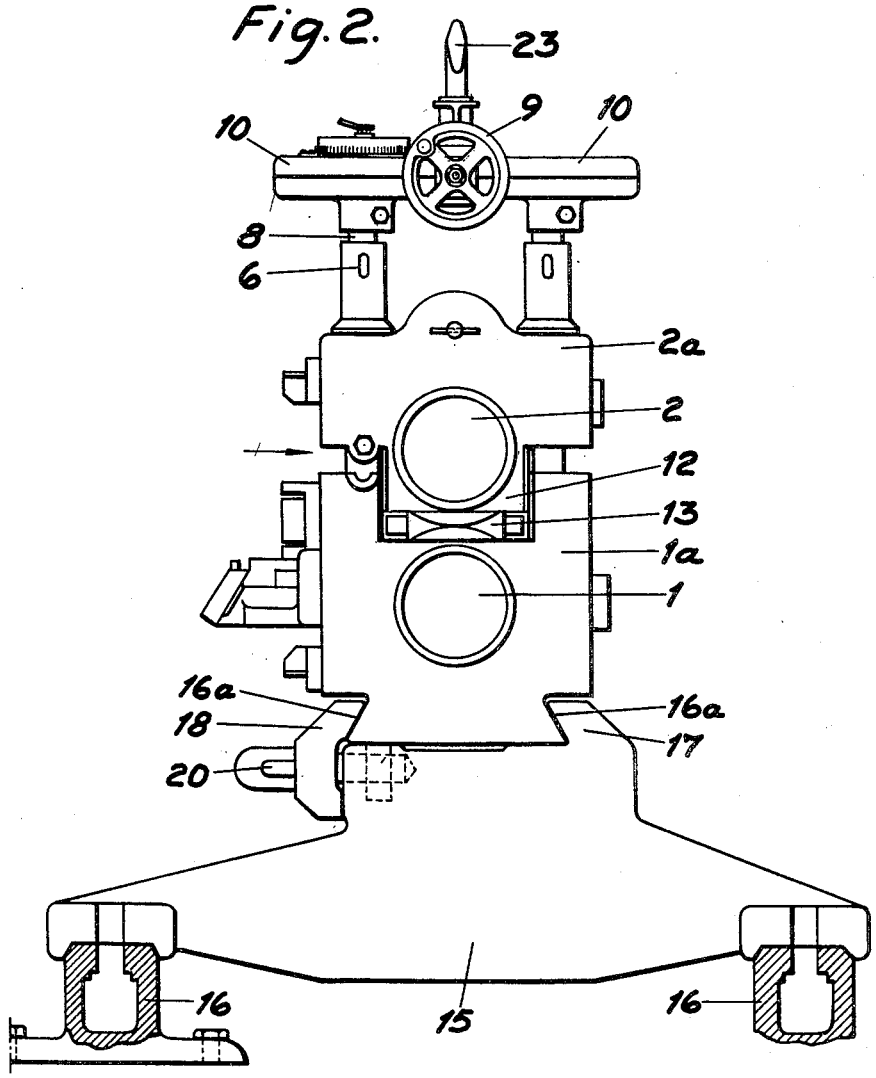

Figs. 1 and 2 show the twin high mill from two sides at right angles to one another.

The other figures show parts of the rolling mill on a larger scale. Thus, Fig. 3 shows the two rolls with their bearings from the feeding end (i. e. from the right in Fig. 2).

Figure 3:
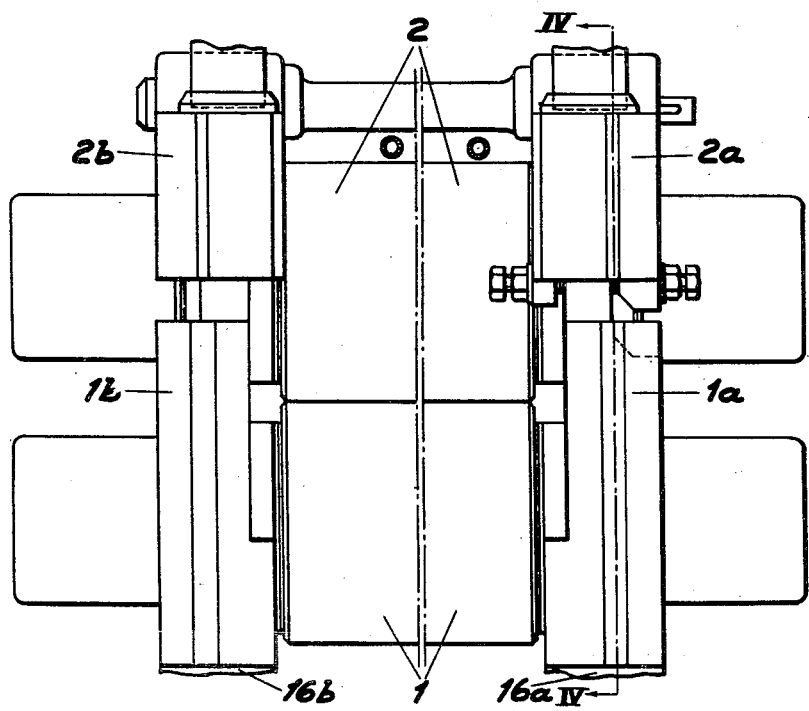
Figure 4:
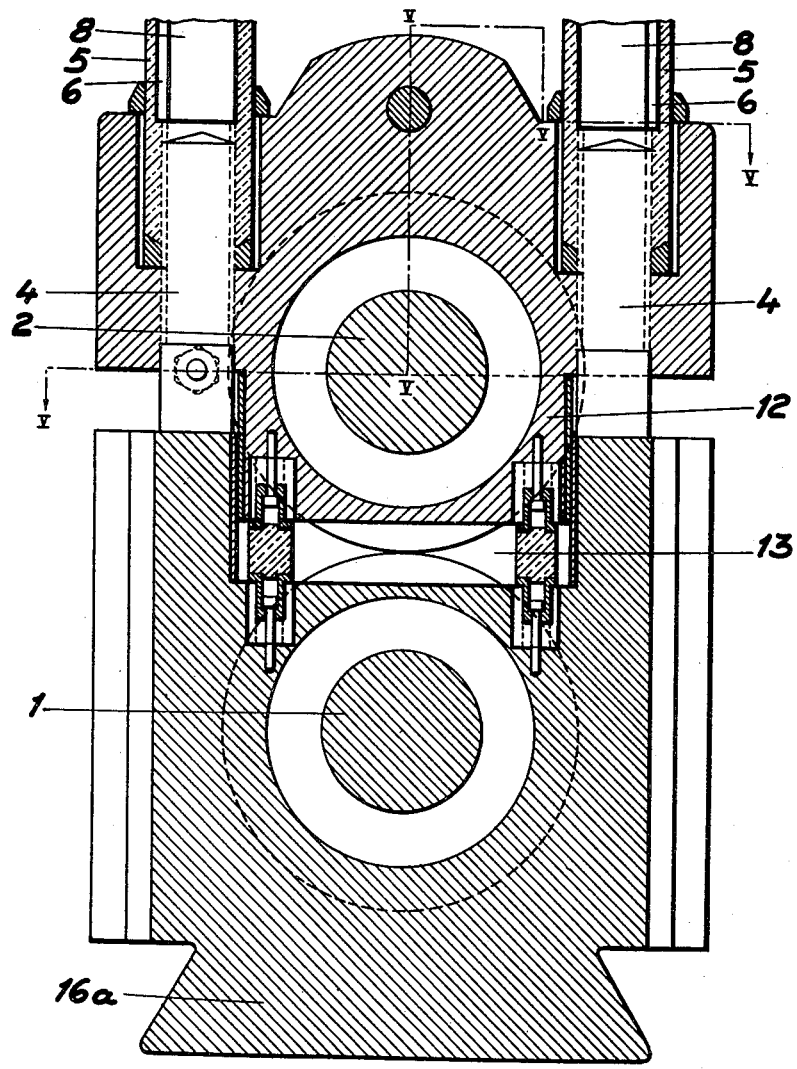
Figure 5:
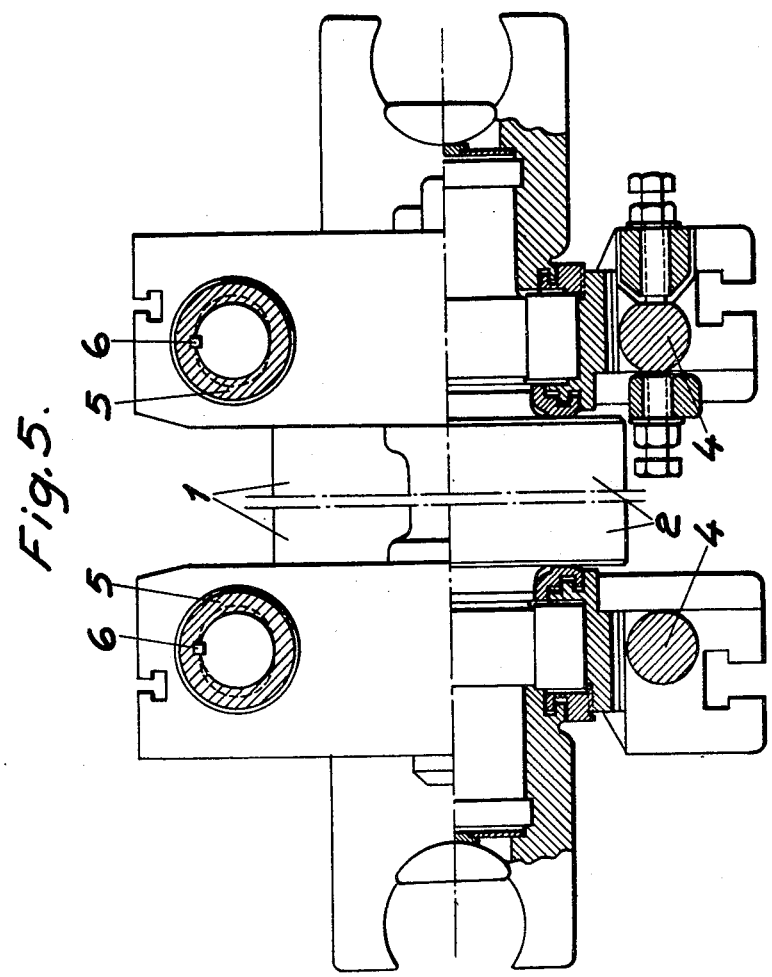

Fig. 4 shows the same parts viewed in section along the line V—V in Fig. 3, and Fig. 5 shows the same parts in section along the line V—V—V—V—V in Fig. 4.

The rolls are indicated by 1, 2 and the roll bearing blocks by 1a, 1b and 2a, 2b. The latter are connected by specially formed stay-screws, two at each roll end side. Each stay-screw consists of a screw 4 fixed in the lower bearing block 1a and 1b respectively, the said screw extending some distance upwards into the upper bearing block 2a and 2b respectively, of a screw bushing 5 sitting on the said screws, and of a spindle 8 fixed in the said bushing, e. g. by means of a spline 6, Figs. 4, 5. The two spindles in the upper bearing blocks are adapted to be turned synchronously in a known way by means of a handwheel 9, a shaft 9a and worm gears enclosed in casings 10, Figs. 1, 2. By turning the spindles 8 and the bushings 5 by means of the handwheel 9 the necessary adjustment of one roll relatively to the other can be effected.

In order that the rolls shall be well supported and guided in their lateral direction, i. e. be prevented from displacement in their transverse direction, I have, in addition to the stay-screws, also provided for that each upper bearing block 2a and 2b respectively and lower bearing block 1a and 1b respectively engage one another. As shown on the drawing in Figs. 2, 4 this can be obtained thereby that the upper bearing block has a projection 12 and the lower bearing block a corresponding recess 13, Figs. 2 and 4. The bearings are prevented only by the stay-screws from being displaced in relation to each other in the longitudinal direction of the rolls, see Fig. 5. Naturally, also other guide device can be used.

Moreover, by the arrangement of the stay-screws the bearings and the rolls are combined to a unit or block which rests on a support consisting, for example, of two base girders 15 connected by a cross piece 19. The said girders rest in their turn on spaced foundation rails 16 in the floor. As already indicated in the beginning of this description, the mounting of this unit or block in such a way that it can be replaced by another unit or block with other rolls or other adjustment of the rolls, is an essential part of the invention. The detachability of the block has been obtained in the shown embodiment thereby that each lower bearing block 1a, 1b is formed with a dovetail seating portion 16a, 16b extending in the direction of the axis of the bearings and the girders 15 with corresponding guides 17, 18. The guide pieces 18 are detached by removing two splines or the like 20. By this the bearing and roll block can be rapidly detached from the girders 15. The block can then be lifted off from the girders. For the application of the lifting device to the block the stay-screws have been connected with a yoke 22 in which a hook 23 is fixed.

Thanks to the guides 16a, 16b, 17, 18 the block can be adjusted to a certain degree in the axial direction of the rolls, which can be of importance particularly if the roll pair is to be driven together with another pair placed right behind or before or laterally of the firstmentioned pair. The guides can, if desired, be made adjustable also in the transverse direction of the rolls.

Roller bearings or sliding bearings of suitable types can be used in all axle journals.

It is here left out how the rolling mill is arranged in details as regards conducting devices, cooling water supply and so on. It should only be mentioned that the lastmentioned devices should be mounted on the bearing and roll block so that they accompany the same at the replacing. Moreover, only such details are mentioned as are connected with the invention.

It is easily seen that, due to the exchangeability, the described roll bearing device offers great advantages over the ordinary rolling mills with housings, the rolls of which must be exchanged individually or with roll exchanging magazine and be adjusted in the housing itself, which results in long interruptions of the drive. According to this invention it is possible to adjust the rolls in advance in their proper mutual positions so that the interruption of the drive is limited to the exchange itself, which need not take many minutes thanks to the simplified arrangement.

Having now described my invention, what I claim as new and desire to secure by Letters Patent is:

1. A rolling mill including a pair of elongated spaced parallel rails, a pair of base members lying transversely of said rails and positioned in spaced relation longitudinally of said rails, each base member having means for seating its one end on one rail, means seating its other end on the other rail and seat means located intermediate its ends and at the top thereof, a lower bearing block on each said seat means and detachably connected thereto, a lower roll extending between said bearing blocks and having end journals each journal mounted in the bearing of a bearing block, each of said bearing blocks having upstanding stay screws mounted thereon, an upper bearing block mounted on the screws of each lower bearing block, an upper roll extending between said upper bearing blocks and having end journals mounted in the bearings thereof, and means connected between said lower bearing blocks and between said upper bearing blocks so that said bearing blocks, stay screws and rolls may be lifted as a unit from said seat means.

2. A rolling mill as claimed in claim 1 in which each said seat means and the detachable connection of a lower bearing block therewith comprises a dovetail seating portion on each of said lower bearing blocks extending in the direction of the axis of the bearing thereof and a fixed and detachable rail member on each of said base members for engagement with the respective dovetail seating portions.

SVEN ERIK MALTE NORLINDH.

REFERENCES CITED

The following references are of record in the file of this patent:

UNITED STATES PATENTS

| Number | Name | Date |
|---|---|---|
| 287,659 | Gifford | Oct. 30, 1883 |
| 1,431,668 | Kennedy | Oct. 10, 1922 |
| 1,499,656 | Hein | July 1, 1924 |
| 1,908,269 | Palmgren | May 9, 1933 |
| 2,335,626 | Wintriss et al. | Nov. 30, 1943 |

FOREIGN PATENTS

| Number | Country | Date |
|---|---|---|
| 3,774 | Great Britain | Mar. 24, 1885 |